(12) United States Patent
Birkholz et al.

(10) Patent No.: US 8,408,522 B2
(45) Date of Patent: Apr. 2, 2013

(54) LIFTING DEVICE

(75) Inventors: Holger Birkholz, Faulbach (DE);
Werner Dölger, Freudenberg (DE);
Robert Miltenberger, Miltenberg (DE);
Ralf Natterer, Mömlingen (DE)

(73) Assignee: Haacon Hebetechnik GmbH,
Freudenberg (DE)

( * ) Notice: Subject to any disclaimer, the term of this patent is extended or adjusted under 35 U.S.C. 154(b) by 686 days.

(21) Appl. No.: 12/375,697

(22) PCT Filed: Jul. 12, 2007

(86) PCT No.: PCT/DE2007/001246
§ 371 (c)(1),
(2), (4) Date: Jan. 30, 2009

(87) PCT Pub. No.: WO2008/014745
PCT Pub. Date: Feb. 7, 2008

(65) Prior Publication Data
US 2010/0001244 A1      Jan. 7, 2010

(30) Foreign Application Priority Data
Jul. 31, 2006   (DE) .................. 10 2006 035 915

(51) Int. Cl.
*B60S 9/02*       (2006.01)
(52) U.S. Cl. ........ 254/425; 254/418; 254/419; 254/422; 254/424
(58) Field of Classification Search .................. 254/418, 254/419, 422, 424, 425
See application file for complete search history.

(56) References Cited

U.S. PATENT DOCUMENTS

| | | | |
|---|---|---|---|
| 5,435,523 A | 7/1995 | Hying et al. | |
| 5,868,060 A * | 2/1999 | Plank et al. | ........................ 92/19 |
| 6,099,016 A | 8/2000 | Peveler | |
| 7,152,848 B2 * | 12/2006 | Pfleging et al. | ............... 254/419 |
| 2002/0180198 A1* | 12/2002 | Schubert et al. | ........... 280/763.1 |
| 2003/0089898 A1 | 5/2003 | Straw | |
| 2003/0168648 A1* | 9/2003 | Alguera Gallego et al. | .. 254/419 |

FOREIGN PATENT DOCUMENTS

| | | |
|---|---|---|
| DE | 3119359 A1 | 12/1982 |
| DE | 3604097 A1 | 8/1987 |
| DE | 19616704 A1 | 10/1997 |
| DE | 19836635 A1 | 2/2000 |

(Continued)

OTHER PUBLICATIONS

"PCT International Search Report dated Oct. 12, 2007 for PCT/DE2007/001246, from which the instant application is based," 2 pgs.

(Continued)

*Primary Examiner* — Monica Carter
*Assistant Examiner* — Nirvana Deonauth
(74) *Attorney, Agent, or Firm* — Fredrikson & Byron, P.A.

(57) ABSTRACT

The invention relates to a lifting device (10), in particular a semitrailer support or the like, comprising a shank tube (11) and a support tube (12) which is movable with respect to the shank tube, wherein on the shank tube a lifting gear mechanism (26) is arranged which comprises an input shaft arrangement (27) for connecting a drive device, and an output shaft arrangement (28) for driving a lifting spindle (20) which is arranged within the support tube and which acts on a pressure plate (18) arranged within the shank tube, wherein the pressure plate is located above the lifting gear mechanism.

9 Claims, 2 Drawing Sheets

FOREIGN PATENT DOCUMENTS

| | | |
|---|---|---|
| DE | 19839359 A1 | 3/2000 |
| DE | 19955998 A1 | 5/2001 |
| DE | 20305175 U1 | 9/2003 |
| DE | 102005034554 A1 | 2/2007 |
| EP | 0513973 A | 11/1992 |
| EP | 0688687 A1 | 12/1995 |
| EP | 0845396 A | 6/1998 |
| EP | 0972689 A | 1/2000 |
| EP | 1236630 A1 | 9/2002 |
| EP | 1350701 A | 10/2003 |
| EP | 1598304 A | 11/2005 |
| RU | 2220090 C1 | 12/2003 |

OTHER PUBLICATIONS

"PCT International Search Report dated Dec. 4, 2007 for PCT/DE2007/001247," 2 pgs.

"PCT International Search Report dated Dec. 7, 2007 for PCT/DE2007/001257," 2 pgs.

"PCT International Search Report dated Dec. 4, 2007 for PCT/DE2007/001248," 2 pgs.

* cited by examiner

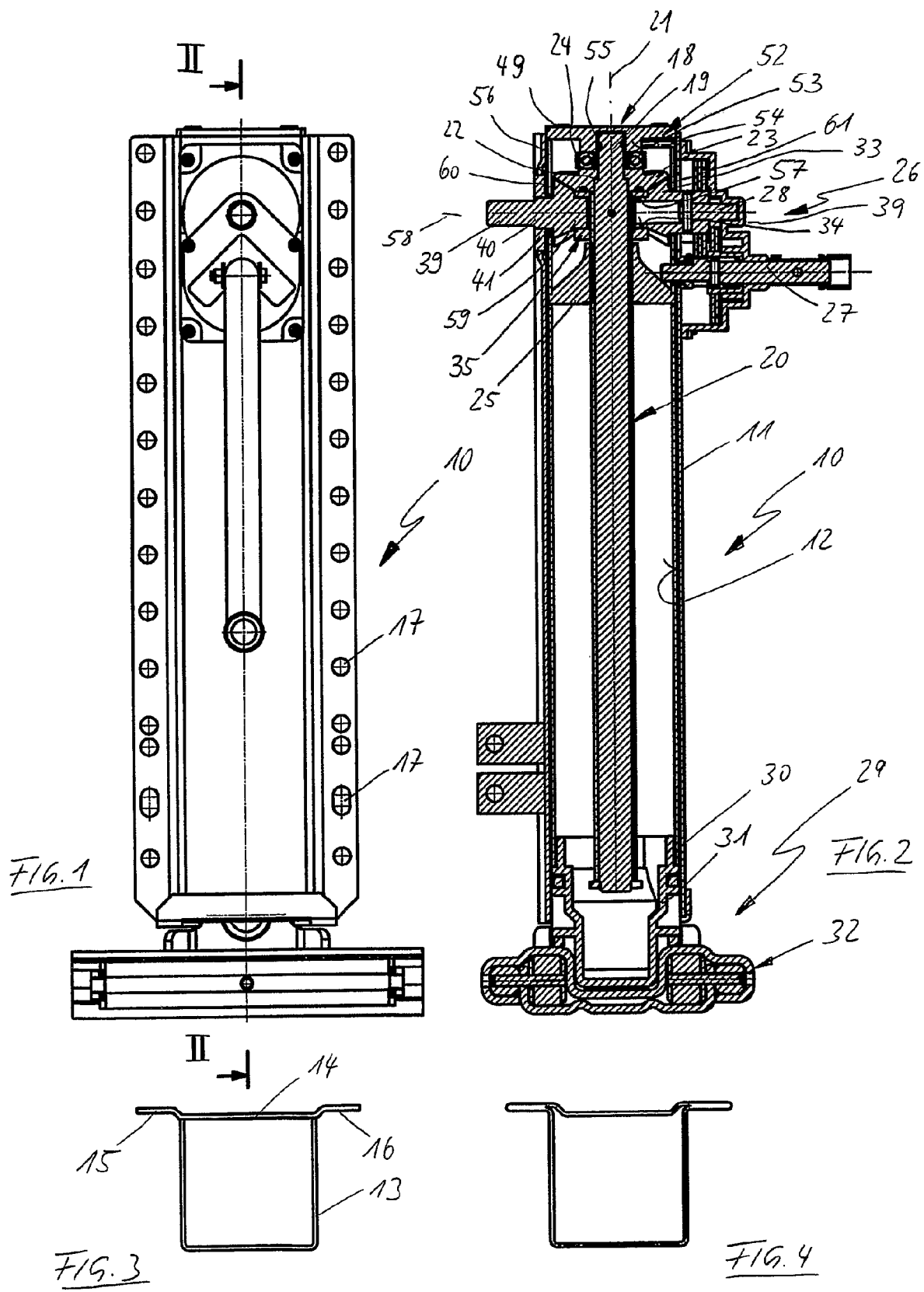

LIFTING DEVICE

RELATED APPLICATIONS

This application is a 35 U.S.C. 371 national stage filing from International Application No. PCT/DE2007/001246 filed Jul. 12, 2007, which claims priority to German Application No. 10 2006 035 915.1 filed Jul. 31, 2006, the teachings of which are incorporated herein by reference.

The present invention relates to a lifting device, in particular a semitrailer support or the like, comprising a shank tube and a support tube which is movable with respect to the shank tube, wherein on the shank tube a lifting gear mechanism is arranged which comprises an input shaft arrangement for connecting a drive device, and an output shaft arrangement for driving a lifting spindle which is arranged within the support tube and which acts on a pressure plate arranged within the shank tube.

Lifting devices of the type mentioned above are used in the application as semitrailer supports, for example, as height-adjustable support devices for so-called "semitrailers", when they are parked independently from a tractive vehicle. In known lifting devices, the so-called "pressure plate", which serves for supporting the lifting spindle against the shank tube with an intermediately arranged axial bearing, is located in the upper end region of the lifting spindle below the lifting spindle gearwheel, which is regularly designed as a bevel gearwheel and which serves for driving the lifting spindle. Furthermore, the lifting gear mechanism's output shaft arrangement, which serves for driving the lifting spindle gearwheel, is regularly located above the pressure plate as well. As a consequence, this results in that a substantial portion of the construction height of a lifting device, which is substantially defined by the length of the shank tube, is used by the lifting gear mechanism's region which is located above the pressure plate. This region hence can not be used any more for receiving the support tube, the length of which is substantial for the achievable lifting height of the lifting device. In terms of a lifting height/construction height ratio which is as favorable as possible, it is desirable that the support tube length received in the shank tube preferably approaches the shank tube length.

The present invention is hence based on the object to propose a lifting device which has an improved lifting height/construction height ratio.

For solving this object, the lifting device according to the invention comprises the features of claim 1.

In the lifting device according to the invention, the pressure plate is arranged above the lifting gear mechanism.

The lifting device according to the invention hence allows to achieve an overlap between the support tube and the shank tube in the retracted condition of the support tube, wherein the overlap is not reduced by an arrangement of the pressure plate below the lifting gear mechanism, as it is the case in the prior art.

According to a particular advantageous embodiment of the lifting device, the pressure plate is arranged in such a manner that it closes the shank tube on the front end. This arrangement of the pressure plate not only allows an overlap between the support tube and the shank tube with the overlap being completely unaffected by the position the pressure plate. Rather, the pressure plate, which is positioned in such a manner on the front end, forms at the same time a closure of the shank tube towards the outside, and hence an appropriate cover of the lifting device.

An overall optimum space-saving arrangement of the lifting gear mechanism, which, at the same time, has the maximal possible overlap between the support tube and the shank tube, is obtained when the output shaft of the lifting gear mechanism acting on the lifting spindle is arranged transversely to the lifting spindle and is received with its shaft end facing towards the lifting spindle in a first bearing receptacle of a bearing device arranged coaxially to the lifting spindle.

Because of the bearing device, an inner bearing position of the output shaft arrangement independently from the tube wall of the shank tube is possible so that the output shaft arrangement has to extend only to the lifting spindle and not beyond the lifting spindle or past it, respectively.

When, in addition, the bearing device for receiving the shaft end, with the shaft end facing towards the lifting spindle, of a connection shaft arranged aligned with the input shaft arrangement comprises a second bearing receptacle, which is arranged spaced apart from the first bearing receptacle through a lifting spindle passage formed in the bearing device, and which is aligned with the first bearing receptacle, then, in spite of the output shaft arrangement being arranged only on one side of the lifting spindle, a connection shaft can be provided which is aligned with the output shaft, and which in a manner known per se serves for the connection of a first lifting device with a second lifting device of a pair of two lifting devices arranged opposing each other on a vehicle chassis.

It is particularly advantageous when the lifting spindle passage, which is necessary anyway for passing the lifting spindle through, is provided with a radial bearing receptacle so that the bearing device can serve not only for receiving the output shaft arrangement and the connection shaft but also for the radial guidance of the lifting spindle.

When the arrangement or fixation, respectively, of the bearing device in the shank tube is carried out by means of a connection with the pressure plate, only an axial fixation of the bearing device in the shank tube is implemented so that no mechanical connection of the bearing device to the shank tube with corresponding negative impact on the overlap between the support tube and the shank tube is necessary.

When, in addition, the bearing device is formed in such a manner that between the lifting spindle passage and the pressure plate, a receiving space is arranged for receiving a lifting spindle gearwheel arranged at the lifting spindle end, and an axial bearing arranged between the lifting spindle gearwheel and the pressure plate, then the bearing device quasi forms an internal gearing cage, which in connection with the pressure plate, defines a gear unit which, in addition, serves for receiving the lifting spindle gearwheel and the axial bearing. Such a compact arrangement allows in particular a simplified and hence reliable lubricant supply.

When the lifting spindle end and the pressure plate are interconnected by means of an axially acting locking device, the bearing device is unloaded during the driving operation, during which the lifting device is in its transport configuration, since the entire weight forces, which consist of the support tube and the lifting spindle together with the lifting gear mechanism, including the foot device arranged at the lower end of the support tube, are transmitted by the locking device onto the shank tube bypassing the bearing device. Hereby it is in particular possible to make the bearing device from a plastic material, for example, manufactured by an injection molding method or the like.

It has proven to be particularly advantageous, because it is easy to implement, when the locking device comprises a locking pin which is received on one end in the pressure plate and on the other end in the shank tube wall, and which is inserted tangentially through a ring groove at the lifting spindle end.

Hereinafter, a preferred embodiment of the lifting device is illustrated in more detail by means of the drawing. In the figures:

FIG. 1 shows a lifting device in a front view;

FIG. 2 shows the lifting device illustrated in FIG. 1 in a sectional view along the section line II-II in FIG. 1;

FIG. 3 shows a cross section of a shank tube of the lifting device illustrated in FIG. 1;

FIG. 4 shows an alternative cross section formation of the shank tube cross section illustrated in FIG. 3;

Figure 5:
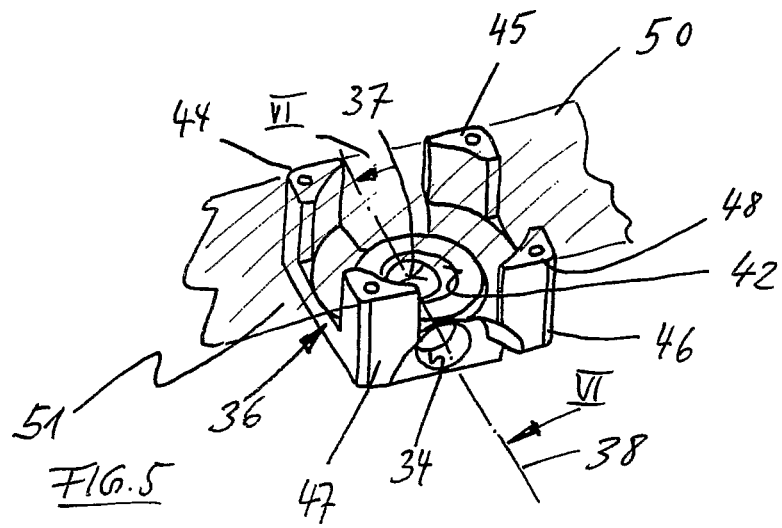
FIG. 5 shows a bearing device for a lifting gear mechanism in a perspective illustration.

From an overview of FIG. 1 and FIG. 2, the structure of a lifting device 10 comprising a shank tube 11 and a support tube 12 coaxially arranged within the shank tube 11 is apparent. According to the embodiment illustrated in FIG. 3, the shank tube 11 consists of a U-shaped shank tube profile 13 and a mounting plate 14, which completes the profile 13 to form a square tube, and which forms at the same time the back wall of the shank tube 11. The mounting plate 14 serves for connection to a vehicle chassis and, on connection rails 15, 16 formed on the side, comprises a plurality of mounting bores 17 which allow a connection to differently formed vehicle chassis, or in different mounting heights on a vehicle chassis, respectively.

As is apparent in particular from the sectional view illustrated in FIG. 2, the support tube 12 received in the shank tube 11 extends substantially over the entire length of the shank tube 11. As is further shown in FIG. 2, as a quasi front-end closure, the shank tube 11 comprises a pressure plate 18, which serves for receiving an upper lifting spindle end 19 of a lifting spindle 20 which extends on a longitudinal axis 21 of the lifting device 10 or the support tube 12, respectively. Furthermore, at the upper lifting spindle end 19, a lifting spindle gearwheel 23 is located, which is arranged torque-proof on a shaft collar 22, and which serves for driving the lifting spindle 20, and, together with the lifting spindle 20, rests against the pressure plate 18 via an axial bearing 24.

Arranged on the lifting spindle 20 is a spindle nut 25, which on its circumference is connected in a rotationally fixed manner with the support tube 12 so that a rotation of the lifting spindle 20 due to a driving of the lifting spindle gearwheel 23 via the thread engagement of the lifting spindle 20 with the spindle nut 25, depending on the direction of rotation, causes an extending or retracting of the support tube 12 out of or into the shank tube 11.

For driving the lifting spindle gearwheel 23 serves a lifting gear mechanism 26 which is arranged below the pressure plate 18, and which comprises an input shaft arrangement 27 and an output shaft arrangement 28 which acts on the lifting spindle gearwheel 23.

At the lower end of the support tube 12, a foot device 29 is located which comprises a foot receptacle 31 connected with the lower front end 30 of the support tube 12, as well as a pivoting foot 32 connected with the foot receptacle 31.

Figure 6:
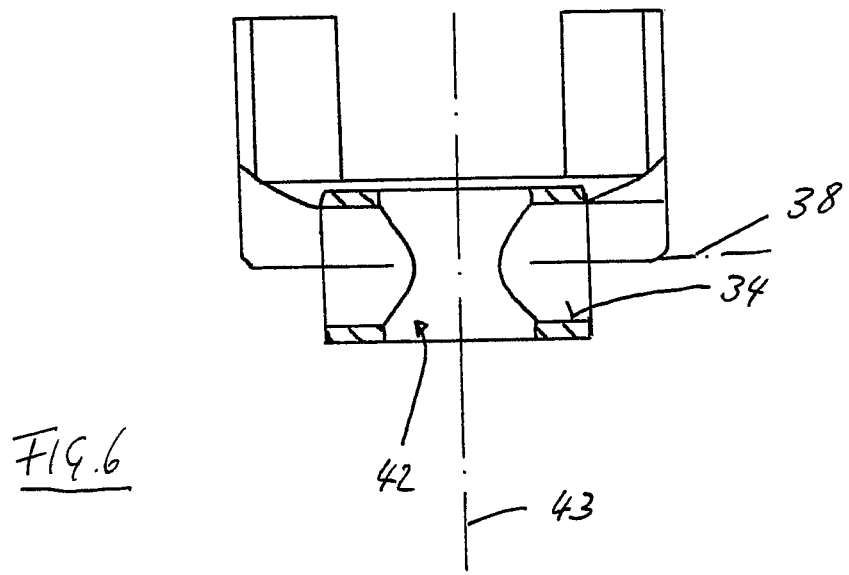
FIG. 6 shows the bearing device illustrated in FIG. 5 in a sectional view along the section line VI-VI in FIG. 5.

As is shown in FIG. 2, the output shaft arrangement 28, on which a lifting spindle driving gearwheel 33, which, for forming a lifting spindle bevel gear mechanism, is here also formed as a bevel gearwheel and is located arranged in a rotationally fixed manner, is received with an inner shaft end 57 facing towards the lifting spindle 20 in a bearing receptacle 34 of a bearing device 35. As illustrated in the FIGS. 5 and 6, the bearing device 35 comprises within a substantially disk-shaped bearing body 36, in addition to the bearing receptacle 34, a bearing receptacle 37 formed opposing thereto, which is arranged on a bearing axis 38 aligned with the bearing receptacle 34. The bearing axis 38 corresponds with a shaft axis 58 which is illustrated in FIG. 2, and on which in addition to and aligned with the output shaft arrangement 28, a connection shaft 39 is also arranged, which is supported with one shaft end 59 in the bearing receptacle 37, and with a bearing collar 40 in a shaft bearing 41 which is arranged in the mounting plate 14, and which is preferably made from plastic.

In addition to bearing receptacles 34 and 37 arranged on the bearing axis 38, within the bearing body 36 a lifting spindle radial bearing 42 is formed with a bearing axis 43 (FIG. 6) which is aligned concentrically to the lifting spindle axis and transversely to the bearing axis 38.

From the bearing body 36 and parallel to the bearing axis 43, four connection bars 44, 45, 46, and 47 extend upwards which serve for the mechanical connection of the bearing body 36 of the bearing device 35 with the pressure plate 18. For this, each of the connection bars 44 to 47 have on their upward facing front end a connection bore 48, which, by means of threaded bolts 49 (FIG. 2) arranged in the pressure plate 18, allows a detachable connection with the pressure plate 18.

Between the connection bars 44 to 47 or the bearing body 36, respectively, and a connection plane 50 defined by the front ends of the connection bars 44 to 47, a gear chamber 51 is formed, which, as illustrated in FIG. 2, allows the arrangement of the lifting spindle gearwheel 23 and the axial bearing 24 within the bearing device 35.

For relieving the bearing device 35 from weight forces, an axial locking device 52 is provided between the pressure plate 18 and the lifting spindle end 19 of the lifting spindle 20. The locking device 52 comprises a tangential pin 54 which is inserted transversely to the lifting spindle axis through a bore, which is not shown here in detail, in a lifting spindle support collar 53 of the pressure plate 18, whereby the tangential pin is inserted through a ring groove 55 which is formed circumferentially on the lifting spindle end 19 and receives the weight forces in this manner.

As is clearly apparent from FIG. 2, the support tube 12 received in the shank tube 11 reaches with its upper front end 56 to the pressure plate 18 which forms the upper front-side closure of the shank tube 11. To allow this, the support tube comprises slotted recesses 60, 61 extending to the front end 56 for the connection shaft 39 and the output shaft arrangement 28, which each extend out of the support tube 12 through the wall of the shank tube 11 to the outside.

The invention claimed is:

1. A lifting device comprising: a shank tube; a pressure plate located at one end of the shank tube; a support tube concentric with the shank tube and movable with respect to the shank tube; a lifting spindle located within the support tube, the lifting spindle acting on the pressure plate and the lifting spindle resting against the pressure plate via an axial bearing which is operatively coupled to a spindle gearwheel located under the pressure plate; a lifting gear mechanism located on the shank tube below the pressure plate, the lifting gear mechanism comprising an input shaft arrangement for coupling a drive device and an output shaft arrangement for driving the lifting spindle; and wherein the output shaft arrangement has a shaft end and is arranged transversely to the lifting spindle and is received with the shaft end facing towards the lifting spindle in a first bearing receptacle of a bearing device arranged coaxially to the lifting spindle.

2. The lifting device according to claim 1, wherein the bearing device for receiving the shaft end, with the shaft end facing towards the lifting spindle, of a connection shaft arranged aligned with the output shaft arrangement comprises a second bearing receptacle, which is arranged spaced apart from the first bearing receptacle through a lifting spindle passage formed in the bearing device, and which is aligned with the first bearing receptacle.

3. The lifting device according to claim 2, wherein the lifting spindle passage is formed as a lifting spindle radial bearing for radial guidance of the lifting spindle.

4. The lifting device according to claim 1, wherein the bearing device, for transmission of the forces into the shank tube, is coupled with the pressure plate.

5. The lifting device according to claim 2, wherein characterized in that the bearing device, for transmission of the forces into the shank tube, is coupled with the pressure plate.

6. The lifting device according to claim 4, wherein the bearing device comprises between the lifting spindle passage and the pressure plate a receiving space for receiving the spindle gearwheel arranged at a lifting spindle end.

7. The lifting device according to claim 5, wherein the bearing device comprises between the lifting spindle passage and the pressure plate a receiving space for receiving the spindle gearwheel arranged at a lifting spindle end.

8. The lifting device according to claim 6, wherein the lifting spindle end and the pressure plate are connected with one another by means of an axially acting locking device.

9. The lifting device according to claim 8, wherein the locking device comprises a locking pin which is received with its end in the pressure plate, and which is inserted tangentially through a ring groove at the lifting spindle end.

* * * * *